May 18, 1965 J. J. MURRAY ETAL 3,184,683

MECHANICALLY EXCITED ELECTRONIC DETECTING ELEMENT

Filed Jan. 12, 1962

INVENTORS,
James J. Murray
BY John W. Dawson

S. J. Rotondi & A. J. Dupont

United States Patent Office 3,184,683
Patented May 18, 1965

3,184,683

MECHANICALLY EXCITED ELECTRONIC DETECTING ELEMENT

James J. Murray, 809 Hudson St., and John W. Dawson, Rte. 2, Box 181, both of Durham, N.C.

Filed Jan. 12, 1962, Ser. No. 165,970
6 Claims. (Cl. 325—487)
(Granted under Title 35, U.S. Code (1952), sec. 266)

Figure 1:
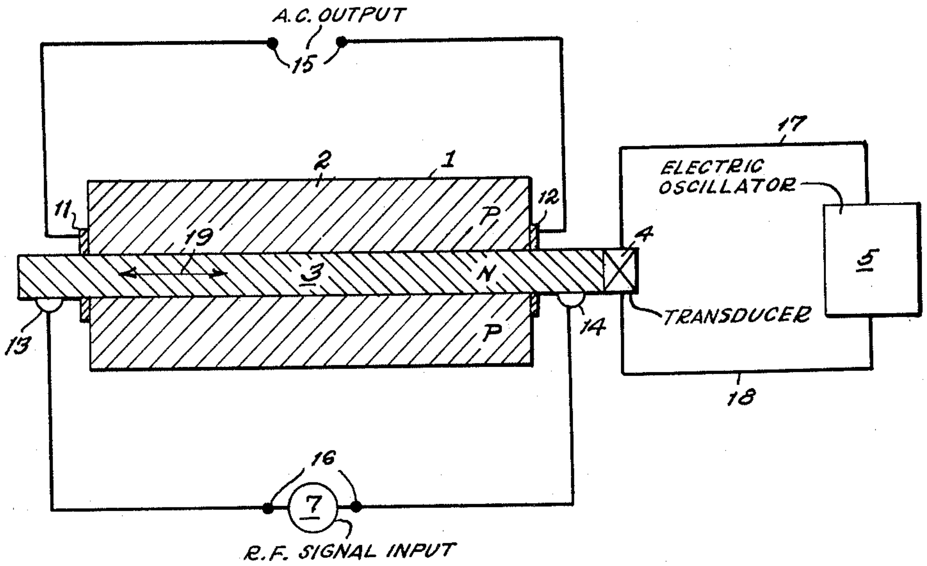

The invention described herein may be manufactured and used by or for the Government for governmental purposes without the payment to us of any royalty thereon.

This invention relates to the application of semiconductor principles in a new geometrical form to provide for a new and novel manner of signal detection or generation.

Current practice of detecting A.-C. signals is based primarily on the utilization of a vacuum tube or a transistor circuit used as a detector in an electronic circuit. Common examples of such detection are the heterodyne and more elaborate superheterodyne receiving systems. The incoming audio modulated A.-C. signal mixes with an internally LC generated A.-C. signal in the detector with the result that the detector element distinguishes the harmonic side bands of the incoming A.-C. signal and presents these intelligible harmonics to the receiver proper for the recipient's use.

In the well known receiver systems however, the number of common-frequency amplifier stages which may be employed in cascade is limited by the unwanted but almost invariably present positive feedback which is a basic limitation on the usable amount of amplification of each stage. As a result of the above limitation the over-all gain of a radio-frequency amplifier is limited, and because of the small number of tuned circuits (usually one per stage) the over-all system also suffers from a lack of selectivity.

The instant invention overcomes these disadvantages by providing a new and novel manner of detection which is feasible and useful.

In the simple form of a heterodyne receiving system a tuned-grid oscillator serves as a frequency changer or translator, and a detector, as well as an oscillator. A carrier $f_c$, and side frequencies $f_c+f_m$ and $f_c-f_m$, can be translated to a new group of frequencies by mixing the original signal with a new frequency $f_x$. The new group of frequencies then are $f_c-f_x$ or $f_k$, $f_c-f_x-f_m$ or $f_k-f_m$, and $f_c-f_x+f_m$ or $f_k+f_m$, with all other frequencies being bypassed by a judicious placing of a capacitor in the cathode circuit. Normally in such reception $f_x$ is made equal to $f_c$ so that $f_c-f_x$ or $f_k$, is equal to zero. The output of such a detector will then contain only the modulation frequency $f_m$.

Difficulties arise however, and the greatest one is to obtain stability of the local oscillator to ensure that the difference between $f_c$ and $f_x$ will remain nominally zero. If this is not maintained, an audible frequency of $f_c-f_x$ will be introduced and will appear in the output. Thus the use of a tuned-grid oscillator in the detecting operation will cause distortion of the side-band components and these $f_m$ components will be distorted due to the addition of the $f_c-f_x$ value.

One general object of this invention therefore is to combine semiconductor principles with normal detection circuitry to provide distortionless audio output.

A further object of this invention is to provide a new and unique detection device which is not limited to the use of electron tubes or transistors.

A further object of this invention is to provide a new and novel method of generating various wave forms which does not require the use of complex electronic circuitry and relies only on the use of semiconductor materials.

A further object of this invention is to provide a unique semiconductor transducer element which is capable of reproducing mechanical actuation into electrical signals.

More specifically an object of this invention is to enable the semiconductor to achieve more and varied uses by providing a new geometrical form and thus effect a device capable of being used in detection and generation systems.

Figure 2:
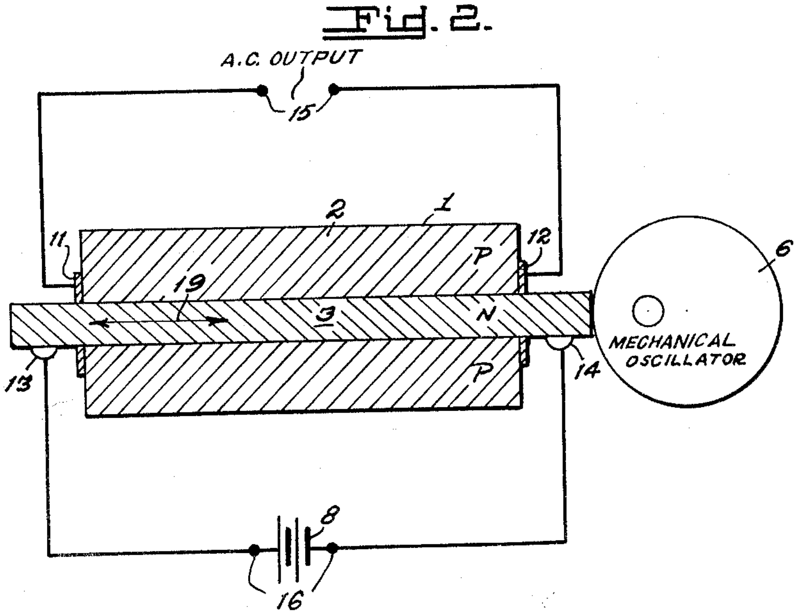

The novel features that are considered characteristic of the invention are set forth with particularity in the appended claims. The invention itself however, both as to organization and method of operation, as well as additional objects and advantages thereof, will best be understood from the following description when read in connection with the accompanying drawings, in which:

FIGURE 1 is a cross-sectional view of a cylindrical form of the semiconductor used as a signal detector; and FIGURE 2 is a similar cross-sectional view of the semiconductor used as a signal generator.

Referring now to the drawings in which like components have been designated by the same reference numerals and particularly to FIGURE 1, there is illustrated a properly doped cylindrical bar, of a single crystal such as germanium or silicon with an inner core 3 being of the N type and the outer section 2 being of the P type. It is to be understood however that the N and P portions can be interchanged, or even that the core 3 can be some conductor, such as copper or the like. Ohmic contacts 11 and 12 are associated exclusively with the P outer section and provide connection to the output terminals 15 which in turn may be connected to an IF amplifier if the detector is used in a receiving system, or to some similar output device as desired. Ohmic contacts 13 and 14 are supplied to the inner core 3 to provide for connection to a radio frequency amplifier if this detector is used in a receiving system, or to some similar input device connected to input terminals 16. Signal source 7 is designative of such an input. Transducer 4 is connected to core 3 which is made movable with respect to outer section 2 and supplies the driving power necessary to move core 3 in a reciprocating motion designated by the arrows 19. Transducer 4 which may be a piezo-electric crystal or the like is provided with the necessary driving signal through lines 17 and 18 from an appropriate source 5, which generally will be an oscillator.

The inner core 3 of the cylindrical N (or P) type material can vibrate along its longitudinal axis upon excitation by a driving force such as a piezoelectric crystal 4, or perhaps even by a suitably mechanically driven piston (not shown). Core 3 vibrates such a short distance that the bond between outer section 2 and inner core 3 is not damaged. The elastic limit of the materials is not exceeded and therefore natural resiliency of the materials returns the parts to their original relative positions. For better illustration as to the operation of this device, an oscillating modulated signal $f_c$, $f_c+f_m$, and $f_c-f_m$ is applied across the inner motionable core ohmic contacts 13 and 14 from a suitable source 7 connected across the input terminals 16. The core is then oscillated longitudinally by means of transducer 4 at the $f_c$ frequency which is supplied by oscillator 5 across lines 17 and 18. This essentially beats the incoming carrier signal with $f_c$ and permits the modulating frequencies $f_m$ and $-f_m$ to be passed to the P type outer cylinder by magnetic induction. These signals are then made available across the ohmic contacts 11 and 12 which are connected to the output terminals 15.

It is evident that the core 3 may also be driven at some other frequency $f_1$ which is higher or lower as the case may require, than some incoming signal $f_2$, so that the difference frequency of $f_1+f_2$ and $f_1-f_2$ can be obtained at the output terminals 15.

The instant device can also be used with a steady or varying D.-C. flow through the motionable type core with mechanical excitation of that core by piezoelectric crystals or other types of vibratory movers. During a steady D.-C. flow of electrons through the movable core with no core movement, there will not be any induced changing magnetic flux in the companion or surrounding envelope of semiconductor P type material. With a motion of the core however, driven by an external vibratory source, the P type material, through coupling of the electron field with that of the holes, will result in an associated flow or movement of the holes in synchronized motion to the movement of the core. This new device then offers a new type of transducer in which mechanical actuation of the core by an external stimulus can be reproduced electrically by pickup of the potential difference created by the hole flow in the P type material.

In the modification shown in FIG. 2 a mechanically offset sine cam 6 is substituted for the transducer 4 and its associated circuitry, with the remainder of the semiconductor device remaining the same. For purposes of illustration, eccentricity of the cam is greatly exaggerated. A D.-C. voltage from battery 8 is applied at input terminals 16 causing a D.-C. electron current flow in the core 3. With a continuous revolution of the sine cam 6 by a motor (not shown) the D.-C. electron flow in the core can be converted into an A.-C. supply at the output terminals 15.

Selection of any type of wave shape resulting across the P type section can be produced by the proper mechanical agitation of the core. For example, a sine wave from across the contacts of the P material would require a sine wave motion drive of the core as pointed out above, while a sawtooth drive would produce a sawtooth electrical signal. Combinations of different wave forms can be inserted in the mechanical motionable core and then separated by proper electrical excitation of the same core resulting in the differentiation of the mechanical signals by the semiconductor secondary.

Although specific embodiments of this invention have been illustrated and described, it will be understood that they are but illustrative and various modifications may be made therein without departing from the scope and spirit of this invention. For instance, the actuation of the movable core can be accomplished by any type of motion producing mechanism or device such as magnetostrictive devices, hydraulic actuators, electric motors, and tuning forks as well as the piezoelectric crystal and cam pointed out above.

What is claimed is:

1. A semiconductor device comprising a first elongated body of semiconductive material of cylindrical form; a second elongated body of semiconductive material of a hollow shape surrounding said first body; a first pair of ohmic contacts, one on each end of said first body for connection to an input source; a second pair of ohmic contacts, one on each end of said second body for connection to an output device; and a transducer element connected to one end of said first body to provide longitudinal movement of said first body in relation to said second body.

2. A device as defined in claim 1 further comprising a source of carrier and side band frequencies signal connected to said first contacts; and a source of carrier signal connected to said transducer, whereby said longitudinal movement of said first body in relation to said second body caused by said transducer will cause only the side band frequencies to appear at the said second pair of contacts.

3. A device as defined in claim 1 wherein said transducer is a piezoelectric crystal.

4. A device as defined in claim 1 further comprising a source of D.-C. current connected to said first contacts, wherein said transducer comprises a sine cam driven by a motor, whereby said longitudinal movement of said first body with respect to said second body caused by said cam produces an A.-C. signal to appear at said second pair of contacts.

5. A semiconductor device comprising a pair of longitudinal bodies of different types of semiconductive material formed in the shape of a cylindrical bar with a core, means to impart relative motion between said bar and said core, means to provide an input signal to one of said longitudinal bodies whereby said signal, and relative motion between said longitudinal bodies, will result in an output signal from the other of said longitudinal bodies.

6. The method of translating an a-m signal by use of apparatus comprising a first body of semiconductive material and a second body of semiconductive material closely adjacent to said first body, said method comprising the steps of applying said a-m signal to one of said bodies, applying a signal of carrier frequency to apparatus connected to said one of said bodies to cause motion of same relative to the other body, and picking off modulating frequencies from said other of said bodies.

References Cited by the Examiner

UNITED STATES PATENTS

| | | | |
|---|---|---|---|
| 1,794,365 | 3/31 | Chireix | 325—448 |
| 1,962,155 | 6/34 | Pierce | 329—198 |
| 2,240,293 | 4/41 | Goddard | 310—8.3 |
| 2,387,472 | 10/45 | Southeimer | 307—88.5 |
| 2,497,770 | 2/50 | Hanson | 179—121 |
| 2,549,550 | 4/51 | Wallace | 179—110.2 |
| 2,695,357 | 11/54 | Donley | 325—451 |
| 2,701,302 | 2/55 | Giacoletto | 325—451 |
| 2,725,553 | 6/56 | Dunlap | 321—46 |
| 2,898,477 | 8/59 | Hoesterey | 307—88.5 |
| 2,929,885 | 3/60 | Meuller | 307—8.5 |
| 2,944,167 | 7/60 | Matare | 307—88.5 |
| 2,953,737 | 9/60 | Bright | 321—47 |
| 3,072,803 | 1/63 | Sato | 307—88.5 |
| 3,081,404 | 3/63 | Memelink | 307—88.5 |
| 3,119,074 | 1/64 | Chang | 325—448 |

DAVID G. REDINBAUGH, *Primary Examiner.*